United States Patent [19]

Campbell et al.

[11] 4,107,691
[45] Aug. 15, 1978

[54] ANTENNA FOR PHASE FRONT HOMING

[75] Inventors: Donn V. Campbell, Eatontown, N.J.; Edward J. Paragi, New Haven, Ind.

[73] Assignee: The United States of America as represented by the Secretary of the Army, Washington, D.C.

[21] Appl. No.: 760,320

[22] Filed: Jan. 18, 1977

[51] Int. Cl.² .......................... G01S 3/20; H01Q 1/48
[52] U.S. Cl. .................................... 343/120; 343/848; 343/908
[58] Field of Search ...................... 343/120, 848, 908

[56] References Cited

U.S. PATENT DOCUMENTS

| 3,364,492 | 1/1968 | Griffee | 343/848 X |
| 3,587,102 | 6/1971 | Czerwinski | 343/708 |
| 3,808,600 | 4/1974 | Bourdier | 343/848 X |
| 3,818,480 | 6/1974 | West | 343/114 X |
| 3,845,488 | 10/1974 | Jones et al. | 343/708 |

Primary Examiner—Maynard R. Wilbur
Assistant Examiner—Richard E. Berger
Attorney, Agent, or Firm—Nathan Edelberg; Sheldon Kanars; Edward Goldberg

[57] ABSTRACT

A VHF radio frequency antenna for a homing receiver suited for airborne applications and comprising a pair of right angled antenna elements of like configuration terminating in a common non-conductive joint of insulator material while their opposite ends terminate in dielectric supports mounted on an electrically conductive ground plane such as an aircraft skin. The ends of the elements terminating in the dielectric supports additionally connect to signal coupling means which feed to a homing receiver or other utilization device through equal length transmission lines.

10 Claims, 7 Drawing Figures

ANTENNA FOR PHASE FRONT HOMING

The invention described herein may be manufactured and used by or for the Government for governmental purposes without the payment of any royalties thereon or therefor.

BACKGROUND OF THE INVENTION

This invention relates generally to radio frequency antennas, and more particularly to homing antennas. Such antennas are of the terminated transmission line type and are well known to those skilled in the art. On example of a direction finding or homing antenna is disclosed in U.S. Pat. No. 3,818,480, issued to Raymond H. West on June 18, 1974. Such an antenna utilizes a single U-shaped antenna element insulatingly mounted on a ground plane and includes circuitry connected thereto for varying the directional characteristics of the antenna system. In addition to the West patent, U.S. Pat. No. 3,845,488 issued to Howard S. Jones, Jr., et al. on Oct. 29, 1974, discloses a rear mounted forward looking radio frequency antenna for projectiles comprised of two L-shaped antenna elements, one of which comprises a solid cylindrical rod, while the other is comprised of a hollow tube having an inner conductor therein which extends beyond the tube and attaches to the cylindrical rod in such a fashion as to form a gap between the mutually opposing end faces of the tube and the rod.

SUMMARY OF THE INVENTION

In accordance with the disclosure herein presented, this invention is directed to an antenna for phase front homing apparatus, said antenna being comprised of two L-shaped VHF antenna conductor elements having like end terminations secured to a common electrical insulator joint to define a U-shaped or "towel bar" structure with the opposite ends of the antenna elements mounted on respective dielectric supports affixed to an electrically conductive ground plane. Circuit means are coupled to each end of the antenna elements adjacent the ground plane for coupling received signals to receiver or other utilization device by means of respective equal length transmisson lines.

DESCRIPTION OF THE PREFERRED EMBODIMENTS

Figure 1:
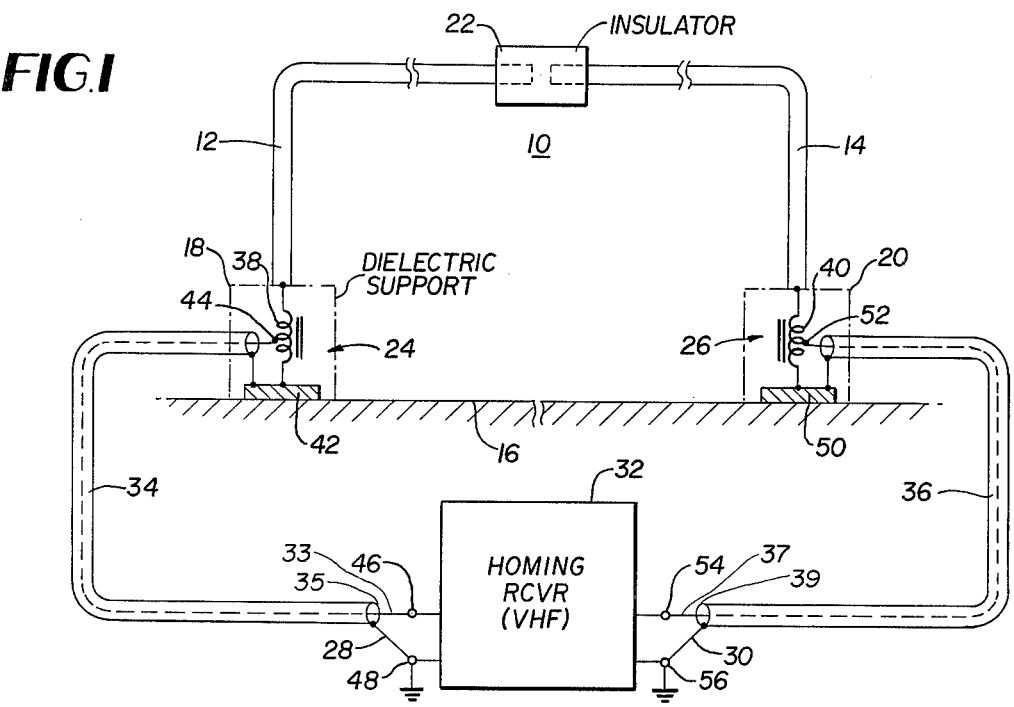
FIG. 1 is a schematic diagram illustrative of the preferred embodiment of the subject invention.

Referring now to FIG. 1, the phase front homing antenna 10 is shown comprised of a pair of like VHF $\lambda/4$ wavelength or less antenna conductor elements 12 and 14 each having an angle formed therein, preferably but not restricted to a right angle, so as to provide respective vertical and horizontal sections relative to a conducting ground plane 16 when mounted on a pair of dielectric supports 18 and 20. The elements are preferably cylindrical in cross section and either solid or hollow depending upon the design requirements. The ends of the horizontal sections of the antenna elements 12 and 14 are mutually opposite one another in colinear and coplanar relationship and terminate in a common joint 22 comprised of non-conductive insulator material such as fiberglass. The ends of the horizontal sections of the antenna elements 12 and 14 do not touch, and accordingly, are adapted to operate as two separate top loaded monopole antennas.

The ends of the vertical sections of the antenna elements 12 and 14 which are fixed to the dielectric supports 18 and 20 are electrically connected to respective electrical networks 24 and 26 which are utilized to match and/or tune the antenna to the inputs 28 and 30 of radio receiver apparatus 32, which preferably comprises a VHF homing receiver. Coupling between the networks 24 and 26 and the receiver inputs 28 and 30, is provided by means of equal length coaxial transmission lines 34 and 36.

The electrical networks 24 and 26 and the embodiments shown in FIG. 1 comprise broadband autotransformers 38 and 40. With respect to transformer 38, one end of the winding is electrically connected to the end of the vertical section of antenna element 12, while its opposite end is connected to an electrical terminal block 42 secured to the ground plane 16. At the antenna end, the center conductor 33 of the transmission line 34 is connected to the winding tap 44 while its outer conductor 35 is connected to the terminal block 42. At the opposite end, the inner conductor 33 is connected to input terminal 46, while the outer conductor 35 is connected to the grounded terminal 48.

In a like manner, autotransformer 40 has one end of its winding electrically connected to the end of the vertical section of antenna element 14 while its opposite end is connected to the terminal block 50 also secured to the ground plane 16. The transformer 40 includes a winding tap 52 to which the inner conductor 37 of transmission line 36 is connected while its outer conductor 39 is connected to the terminal block 50. At the other end of the transmission line 36, i.e. at the receiver end, inner conductor 37 is connected to input terminal 54 while the outer conductor 39 is connected to the grounded input terminal 56.

Figure 6:
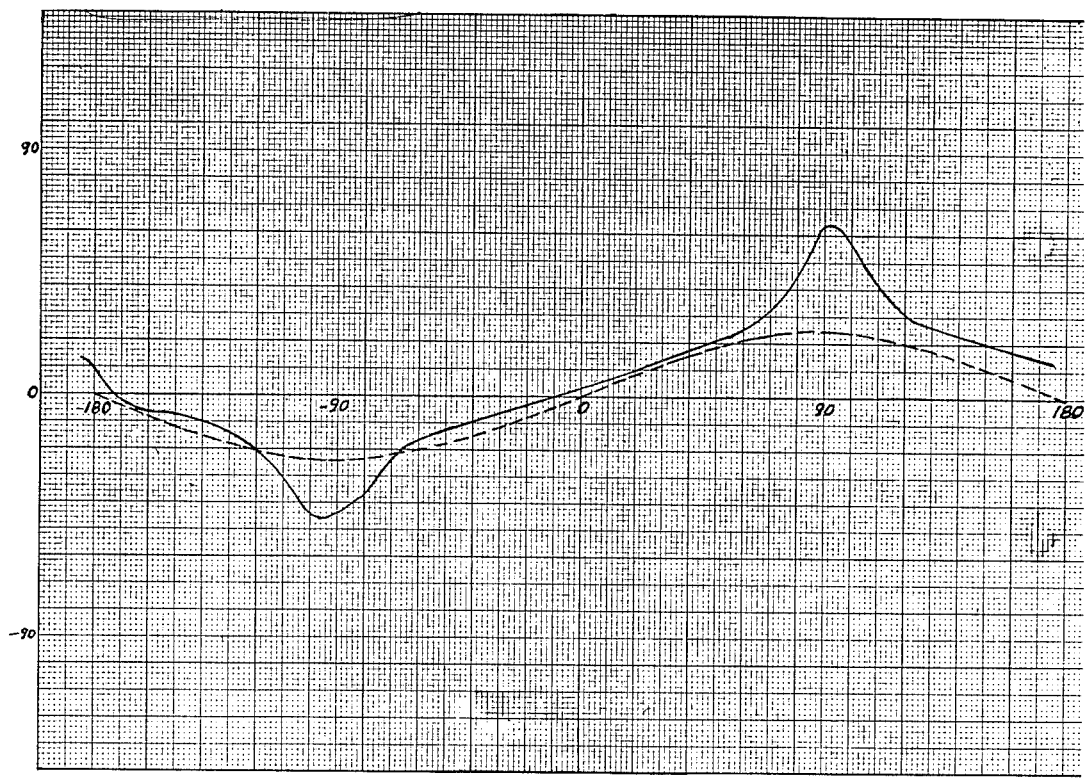
FIG. 6 is a graph typically illustrative of the phase characteristics of the antenna shown in FIG. 1.
Figure 7:
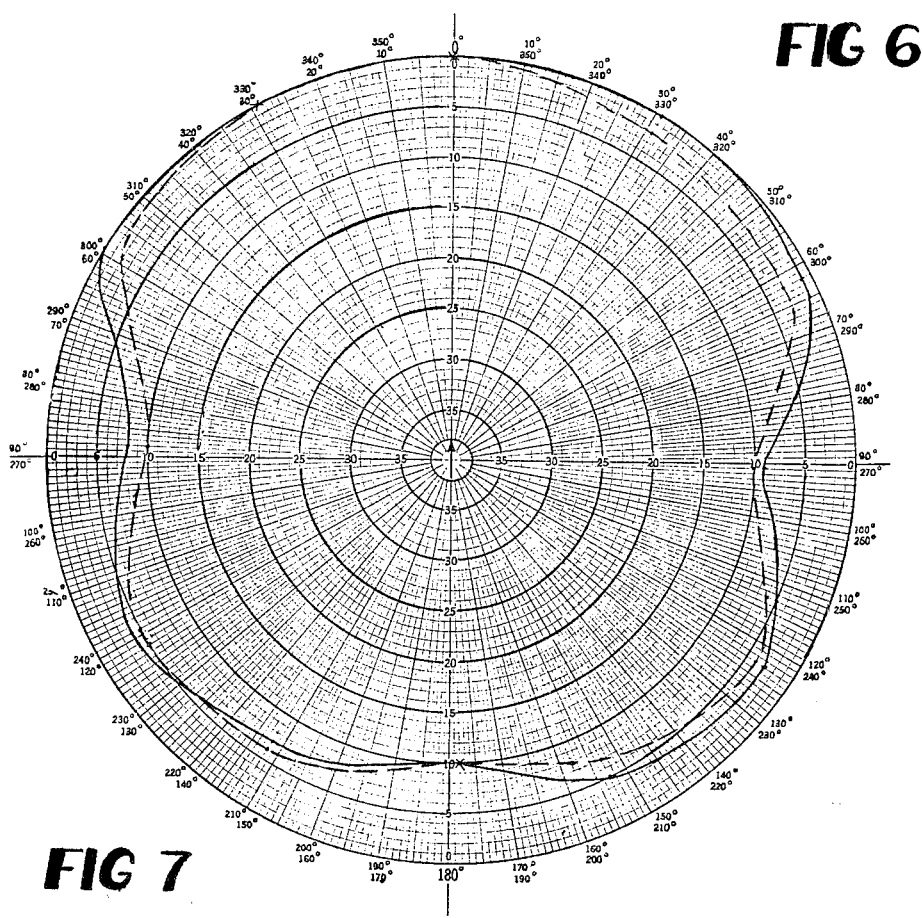
FIG. 7 is a graph typically illustrative of the amplitude characteristic of the antenna shown in FIG. 1.

The antenna configuration shown in FIG. 1 is particularly adapted for "phase front homing." The operation of a phase front homing system is based upon the fact that the direction of arrival of an electromagnetic wave, incident upon a properly designed two-element array antenna, can be determined by comparing the phase-shift between the radio signals received by the two elements comprising the array. When the phase-shift is zero-degrees, e.g. the line joining the two-element array antenna is then perpendicular to the direction of arrival of the incident electromagnetic wave which direction can then be interpreted as the desired "homing" direction. On the other hand, when the phase-shift is positive, the electromagnetic wave may be interpreted as arriving, for example, from the right side of the array. Alternatively, when the phase-shift is negative, the electromagnetic wave may be interpreted as arriving from the left side of the array. The phase and amplitude characteristics of the antenna disclosed in FIG. 1 is furthermore shown in FIGS. 6 and 7, respectively, at an operating frequency of, for example, 30MHz.

Figure 2:
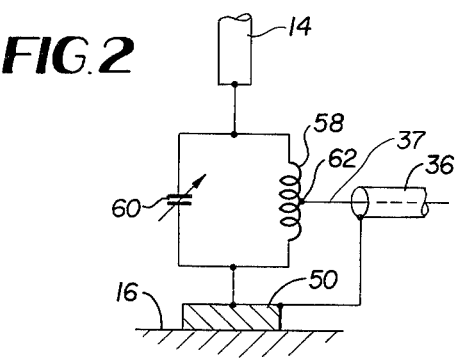
FIG. 2 is a partial schematic diagram illustrative of one type of circuit means for tuning and matching the antenna shown in FIG. 1.

FIGS. 2 through 5 are illustrative of other circuit means for matching and tuning the antenna shown in FIG. 1 to the receiver 32. Since both ends of the antenna 10 are terminated in like networks generally designated 24 and 26, the variations thereof as shown in FIGS. 2 through 5 will concern itself with but one illustrative embodiment in each instance. FIG. 2, for example, discloses the parallel combination of a tapped inductance or autotransformer 58 and a variable capacitor 60 which when desirable can be ganged with a corresponding like capacitor at the opposite end of the antenna. The inner conductor 37 of the transmission line 36 is connected to the winding tap 62. Tuning is thus accomplished by means of the variable capacitor 60.

Figure 3:
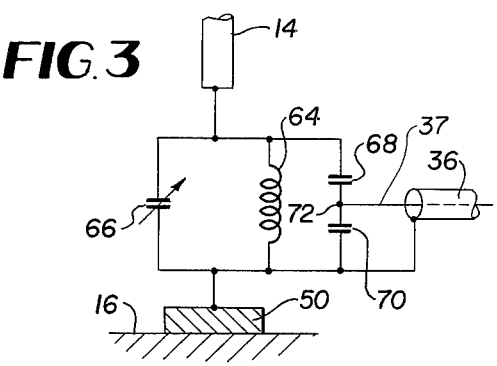
FIG. 3 is a partial schematic diagram further illustrative of another type of circuit means for tuning and matching the antenna.

In the configuration shown in FIG. 3, a fixed inductor 64 is utilized in parallel with a variable capacitance 66; however, a pair of fixed capacitors 68 and 70 are coupled in parallel with the inductor 64 and capacitor 66 with the common connection 72 therebetween being the point of connection of the center conductor 37 of a transmission line 36.

Figure 4:
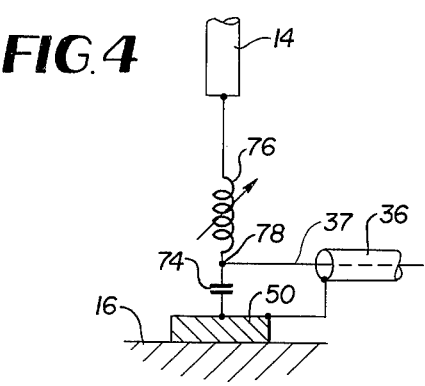
FIG. 4 is a partial schematic diagram being illustrative of still another type of circuit means for tuning and matching the antenna.

With respect to FIG. 4, a series network is shown comprised of a fixed capacitor 74 and a variable inductance 76 which when desirable can also be ganged with a corresponding like variable inductance at the opposite end of the antenna, with the connection of the inner conductor 37 of transmission line 36 being connected to the common connection 78 between the variable inductor 76 and the capacitor 74.

Figure 5:
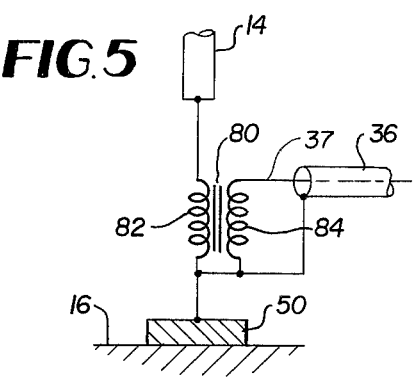
FIG. 5 is a partial schematic diagram illustrative of yet another type of circuit means for tuning and matching the antenna.

Finally, in FIG. 5 the autotransformer configuration shown in FIG. 1 is replaced by a broadband transformer 80 having separate primary and secondary windings 82 and 84 with the center conductor 37 of transmission line 36 being connected to the secondary winding 84.

Thus what has been shown and described is a generally U-shaped "towel bar" type of antenna including a non-conductive joint between the horizontal antenna portions. It is particularly adapted for airborne installations because of its low profile and rigidity and one which is particularly adapted for phase front homing.

Having thus shown and described what is at present considered to be the preferred embodiments of the subject invention.

We claim:

1. A homing radio receiving antenna system comprising in combination:
   an electrically conductive ground plane;
   first and second spaced apart dielectric support means secured to said ground plane;
   first and second substantially like antenna elements each having a bend therein defining a pair of angulated antenna portions one respective end of which terminates in respective said first and second dielectric support means;
   an electrically non-conductive joint commonly terminating the other respective end of said pair of angulated portions in a single plane including said support means, said non-conductive joint supporting said other end of said pair in a spaced apart relation;
   homing radio receiving means having a pair of signal inputs; and
   electrical circuit means including first and second symmetrical electrical impedance means respectively coupled to said pair of inputs and to said angulated portions terminating in said support means for translating received signals from both said first and second antenna elements to said receiving means.

2. The antenna system as defined by claim 1 wherein said first and second antenna elements have a bend defining a pair of angulated portions which are substantially at right angles to one another.

3. The antenna system as defined by claim 1 wherein said first and second like antenna elements are substantially L-shaped.

4. The antenna system as defined by claim 1 wherein said antenna elements are cylindrical in cross section and have substantially equal cross sectional dimensions.

5. The antenna system as defined by claim 1 wherein said electrical impedance means includes first and second equal length transmission line means respectively coupling said first and second antenna elements to said receiving means signal inputs.

6. The system as defined by claim 5 wherein said electrical impedance means additionally includes first and second broadband impedance means respectively coupled between said angulated portions terminated in said support means and said ground plane and said first and second transmission line means.

7. The system as defined by claim 6 wherein said electrical impedance means comprises means for matching and tuning said first and second antenna elements to said receiving means.

8. The system as defined by claim 7 wherein said means for matching and tuning comprises variable electrical reactance means.

9. The system as defined by claim 6 wherein said broadband impedance means comprises transformer means.

10. The system as defined by claim 9 wherein said electrical impedance means additionally includes variable reactance means coupled to said transformer means.

* * * * *